United States Patent [19]

Moretti et al.

[11] Patent Number: 5,374,088
[45] Date of Patent: Dec. 20, 1994

[54] RELEASABLE PLUG-IN CONNECTOR FOR RECEIVING A TUBULAR PLUG-IN PART WITH A PERIPHERAL RETAINING RIB

[75] Inventors: Erminio Moretti, Grenoble; Gaetan D'Aloia, Echirolles, both of France

[73] Assignee: A. Raymond & Cie, Grenoble-Cedex, France

[21] Appl. No.: 172,152

[22] Filed: Dec. 23, 1993

[30] Foreign Application Priority Data

Jan. 2, 1993 [DE] Germany .................... 4300037

[51] Int. Cl.5 ................................ F16L 37/12
[52] U.S. Cl. ........................... 285/305; 285/308; 285/317; 285/319
[58] Field of Search ............ 285/317, 308, 319, 921, 285/305

[56] References Cited

U.S. PATENT DOCUMENTS

| | | | |
|---|---|---|---|
| 4,423,892 | 1/1984 | Bartholomew | 285/319 |
| 4,541,657 | 9/1985 | Smyth | 285/308 X |
| 4,591,192 | 5/1986 | Van Exel | 285/308 X |
| 4,721,331 | 1/1988 | Lemelshtrich | 285/319 X |
| 4,844,512 | 7/1989 | Gahwiler | 285/39 |
| 5,074,601 | 12/1991 | Spurs et al. | 285/921 X |
| 5,090,747 | 2/1992 | Kotake | 285/317 X |
| 5,269,571 | 12/1993 | Haggard | 285/319 X |

*Primary Examiner*—Dave W. Arola
*Attorney, Agent, or Firm*—Finnegan, Henderson, Farabow, Garrett & Dunner

[57] ABSTRACT

A releasable plug-in connector for receiving a tubular plug-in part having a peripheral retaining rib. The plug-in connector consists of a housing having a cylindrical receiving space for receiving the plug-in part, and a separate securing ring made from a hard/resilient plastic material. The ring has retaining edges directed inwardly in the form of an arc of a circle that are pushed apart as the plug-in part is pushed into the connector and that then spring back elastically and engage behind the retaining rib after the plug-in part has been pushed in to lock the part in the connector. The retaining edges are connected to one another at their ends by a pair of V-shaped spring webs that are accessible from the outside of the housing so that they can be pushed into an unlocked position permitting the part to be pulled out of the connector.

5 Claims, 2 Drawing Sheets

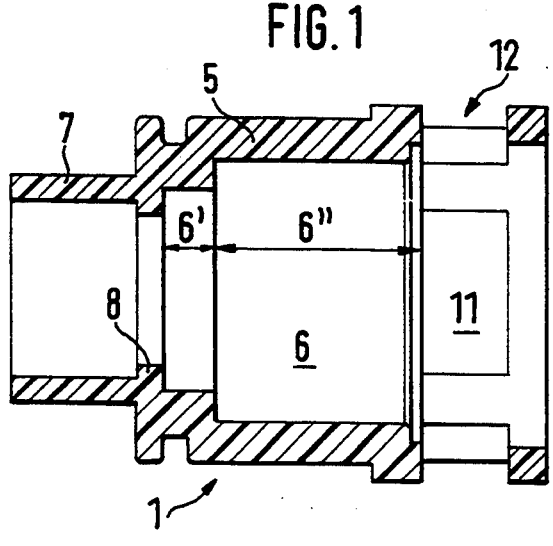
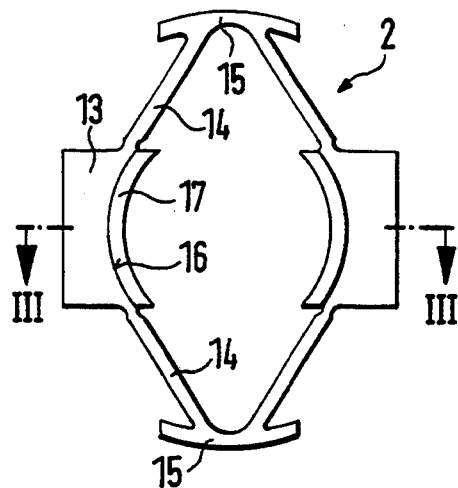
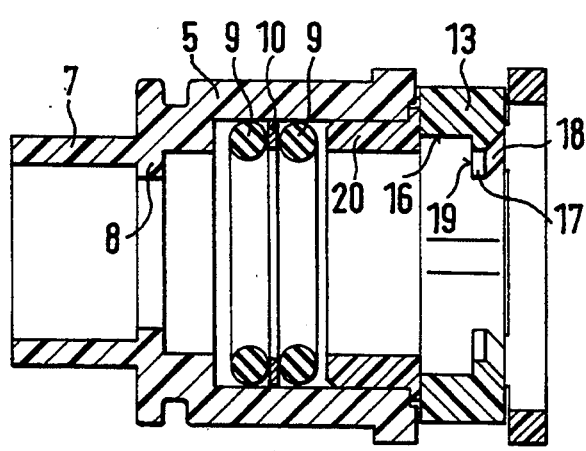
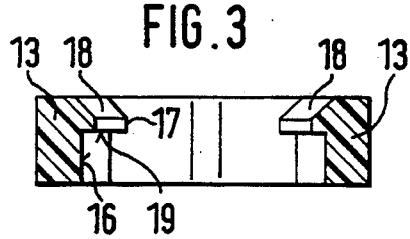
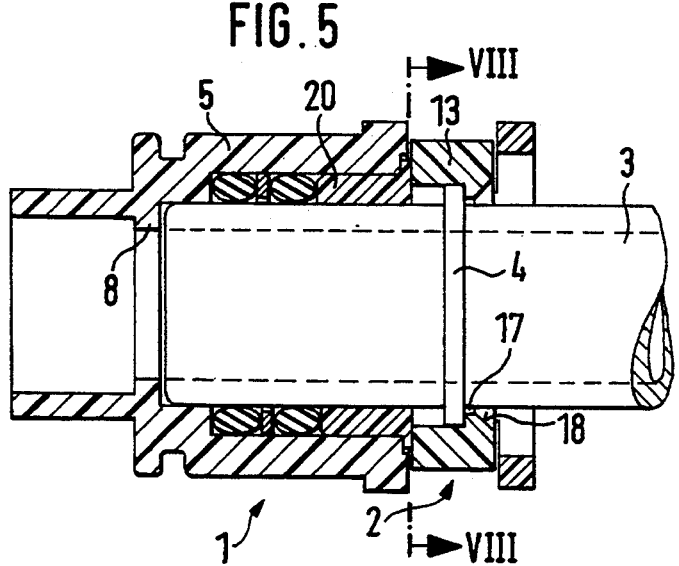

RELEASABLE PLUG-IN CONNECTOR FOR RECEIVING A TUBULAR PLUG-IN PART WITH A PERIPHERAL RETAINING RIB

BACKGROUND OF THE INVENTION

This invention relates to a releasable plug-in connector for receiving a tubular plug-in part with a peripheral retaining rib. The plug-in part may be the end of a relatively rigid metal tube which is used, for example, for fuel lines. It may also, however, in the same way as the connector, be made of a rigid plastic or other common injection-molded material which can be connected in a known manner to a hose line or pipeline.

U.S. Pat. No. 4,844,512 discloses a plug-in connector of this type, in which, at the entrance end of the receiving housing, are located integrally formed retaining edges, which are provided with oblique introduction surfaces and are in the form of an arc of a circle, diametrically opposite one another, on an inner wall of the housing. The entrance end is designed with two mutually shaped, diametrically opposed openings, thus forming a peripheral ring at the entrance end connected to the housing by webs. The retaining edges are located on the inner wall of this ring and are aligned with the webs.

The housing is made of a hard, resilient plastic material, the peripheral ring deforming as the plug-in part is pushed in, so that the retaining edges will yield radially outwards and spring back into a closed position again after a complimentary peripheral retaining rib on the plug-in part has passed them. This connection can be released by pressing the ring together between the retaining edges, so that the retaining edges will move outwards into a release or open position, thus releasing the retaining rib of the plug-in part, allowing it to be pulled out of the receiving housing.

A disadvantage of this plug-in connector is that the housing has to be produced from a material elastic enough to allow the peripheral ring to be correspondingly deformed. Consequently, the plug-in connector is suitable, at best, for low-pressure lines. It is not suitable for high-pressure lines, owing to the retaining forces required for the latter. There is also the danger, in the case of the elastic ring lying exposed in the front part of the receiving housing, that it may be unintentionally pressed together during assembly work, thus moving the retaining edges so far outwards that the plug-in part can spring out of its own accord.

An object of the present invention, therefore, is to configure the connecting parts such that, along with a stable receiving housing, a solid and permanent plug-in connection can be achieved which, in particular, is fully secure even in the high-pressure range. A further object is to ensure, by suitable structural measures, that an undesired opening of the connection—or release of the plug-in part—is avoided.

SUMMARY OF THE INVENTION

This object is achieved in accordance with the present invention by providing a releasable plug-in connector for receiving a tubular plug-in part having a peripheral retaining rib comprising a housing having a through hole for the passage of a fluid with a cylindrical receiving space therein having a central axis for receiving the plug-in part and an entrance end through which the plug-in part is pushed into said receiving space, at least one opening in a side wall of the housing communicating with said receiving space and a separate securing ring made of hard, resilient plastic material and comprising a pair of opposed, spaced and inwardly directed arcuate shaped retaining edges having a common axis, a chamfered surface on one side of each edge extending outwardly and away from the edge in the same axial direction and a pair of V-shaped spring webs connecting said retaining edges together, one leg of each one V-shaped web being connected to an end of the arc of a retaining edge and the other leg of each web being connected to an opposed end of the arc of the other retaining edge, the apexes of the V-shaped webs pointing in opposite directions away from said edges in a direction perpendicular to the axis of the edges, said securing ring being insertable through said opening in the housing and into said cylindrical receiving space so that said arcuate retaining edges are concentric with the axis thereof and fixed against movement in an axial direction with respect to the housing and the chamfered surfaces face the entrance end of the housing, the retaining edges being pushed apart in a radial direction against the resilience of said webs by the rib of the plug-in part as the part is pushed into the housing and then springing back and engaging behind said rib into a locked position to lock said part in said housing, the apex of at least one of said V-shaped webs of the securing ring being accessible from the outside of the housing, whereby upon pushing in on said at least one web in a direction toward the axis of the receiving space, the retaining edges will spread apart in a radial direction into an unlocked position, thereby disengaging the edges from said rib and permitting the plug-in part to be pulled out of the housing.

By using a separate securing ring, the receiving housing can be produced from a rigid plastic material or a castable metal because only the securing ring, along with its retaining edges and connecting webs, need be formed from a suitable hard, but resilient plastic material. Owing to the flexible spring-web connections, the retaining edges can be easily pushed part not only upon introduction of the plug-in part, but also by pushing the webs inwardly with the fingers. Thus the plug-in part can be easily introduced and, if required, can also be quickly and easily removed from the plug-in connector.

BRIEF DESCRIPTION OF THE DRAWINGS

A preferred embodiment of the invention is explained in more detail below and shown in the drawings, in which:

FIG. 1 shows an empty receiving housing of the connector of the invention in longitudinal section;

FIG. 2 is a front view of the securing ring of the connector;

FIG. 3 is a sectional view taken along the line III–III in FIG. 2;

FIG. 4 shows an assembled plug-in connector in longitudinal section;

FIG. 5 shows the same plug-in connector of FIG. 4 with a plug-in part inserted into it in a locked position;

DETAILED DESCRIPTION OF THE INVENTION

Figure 6:
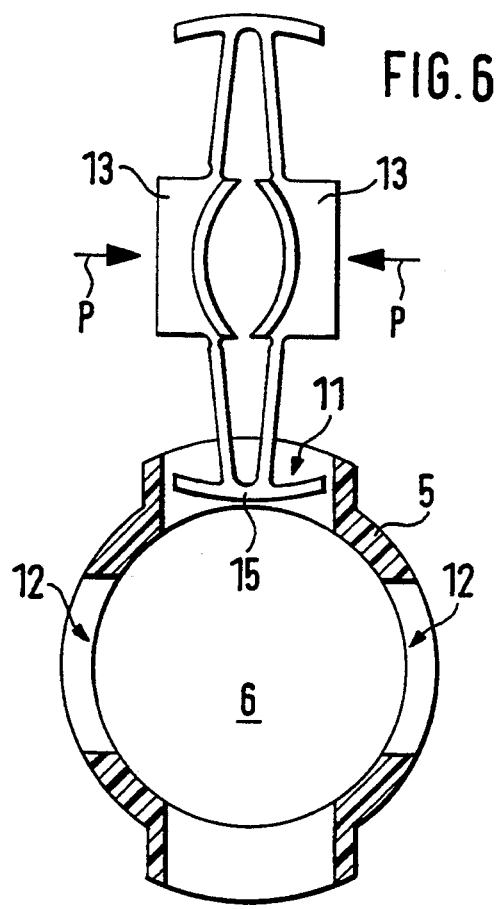
FIG. 6 shows the securing ring as it is being introduced into an opening of the side of the housing which is shown in section.

The plug-in connector shown in the drawings is composed of a receiving housing 1 and of a securing ring or element 2, which is produced from a hard resilient plastic material. The plug-in connector is designed to receive a tubular plug-in part 3 having a peripheral retaining rib 4 that may be the end of a conduit, made of a rigid material, or of a rigid intermediate piece, which can be connected in a known manner to the end of a conduit consisting of a softer material.

According to FIG. 1, receiving housing 1 has a cylindrical housing wall 5 forming an inner receiving space 6 which is provided with a number of graduations and is intended to receive plug-in part 3. The housing has a termination or stop ring 8 at the far end of the receiving space 6 and a cylindrical, concentrically located connection stub 7 intended for joining the connector to a connecting line (not shown) for liquids. Receiving space 6 begins, at the end opposite its entrance end, with a cavity 6', the internal diameter of which corresponds to the external diameter of the plug-in part 3. This is adjoined by a cavity 6" which is of widened diameter and is designed to receive two sealing rings 9, an intermediate ring 10 and a spacer ring 20, as shown in FIG. 4. The internal diameter of ring 20 also corresponds to the external diameter of the plug-in part 3, as shown in FIG. 5.

At the entrance end of the receiving housing 1 are located, in the housing wall 5, two diametrically opposite, similarly shaped openings 11 and, transverse thereto, two diametrically opposed cutouts 12 that are used for introducing and fixing the securing ring 2, described below, in the receiving space 6 of the housing 1.

This securing ring or element 2 is made, as can be best seen in FIG. 2, from two radially spaced, approximately cuboidal shaped support bodies 13 which are connected to one another at their ends via spring webs 14 that are brought together in the shape of a V, the apex of the V's being covered by arcuate pressure plates 15. The mutually facing inner walls 16 of the support bodies 13 are shaped in the form of an arc of a circle having a diameter approximately equal to the external diameter of the retaining rib 4 of the plug-in part 3 and they each have an arcuate shaped retaining edge 17 directed radially inwards. Edges 17 have, on the plug-in side, chamfered surfaces 18 and, on the opposite side, radially offset retaining surfaces 19 that are adapted to the retain rib 4 of the plug-in part 3 after the plug-in part has been pushed into the housing to hold or lock the part in place.

Figure 7:
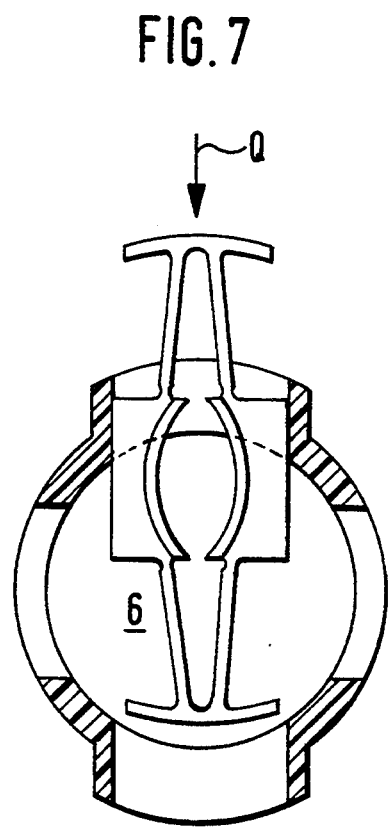
FIG. 7 shows the same securing ring during its introduction into the receiving space of the housing.
Figure 8:
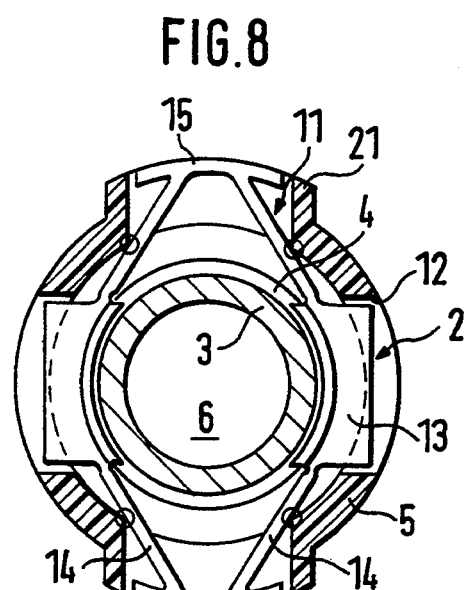
FIG. 8 is a cross-sectional view, turned by 90°, through the receiving space taken along the line VIII––VIII in FIG. 5, with the retaining edges of the securing ring in the locked position.

To insert securing ring 2 into receiving space 6, support bodies 13 are first squeezed together in the direction of arrow "P" as shown in FIG. 6. With one of the pressure plates 15 at the front, securing ring 2 is then introduced in the direction of arrow "Q" into an opening 11 in housing wall 5 and, as shown in FIG. 7, pushed through the receiving space 6. As soon as the support bodies 13 have passed the opening 11, they move radially outwardly, owing to the restoring force of the spring webs 14, and penetrate, once they have arrived in the center of the receiving space 6, into the cutouts 12 to such an extent that, as can be seen in FIG. 8, they are supported against movement in the axial direction.

Enough space remains between webs 14 and housing wall 5 for the support bodies 13 to be able to yield laterally when the plug-in part 3 is pushed in the housing. On introduction of plug-in part 3, retaining rib 4 slides over chamfered surfaces 18, pushing the retaining edges 17 outwards. As soon as the end of plug-in part 3 butts against termination ring 8 and rib 4 has passed edges 17, support bodies 13 will spring back again into their initial position with the trailing side of retaining rib 4 now being locked behind retaining surfaces 19. Plug-in part 3 is now secured in the plug-in connector as shown in FIGS. 5 and 8.

Figure 9:
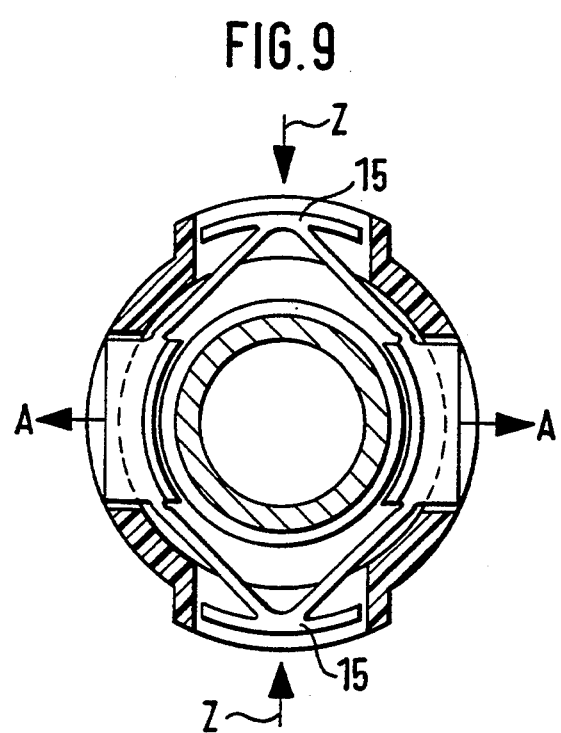
FIG. 9 shows the same cross-sectional view through the receiving space, with the retaining edges in an opened position.

When it is required to release the connector, pressure plates 15 are pressed together in the direction of arrow "Z" until the retaining edges 17 have moved radially apart from one another to such an extent that the retaining edges 17 no longer engage behind the retaining rib 4 as shown in FIG. 9. Plug-in part 3 can then be drawn out of receiving housing 1 without difficulty.

In order to prevent an unintentional release of the plug-in connector, openings 11 in housing wall 5 are encircled by a radially extending border 21 of such a height that, in the locked state of the securing ring 2, the pressure plates 15 will be flush with the borders 21 of the openings 11.

What is claimed is:

1. A releasable plug-in connector for receiving a tubular plug-in part having a peripheral retaining rib comprising a housing having a through hole for the passage of a fluid with a cylindrical receiving space therein having a central axis for receiving the plug-in part and an entrance end through which the plug-in part is pushed into said receiving space, at least one opening in a side wall of the housing communicating with said receiving space and a separate securing ring being made of hard, resilient plastic material and comprising a pair of opposed, spaced and inwardly directed arcuate shaped retaining edges having a common axis, a chamfered surface on one side of each edge extending outwardly and away from the edge in the same axial direction and a pair of V-shaped spring webs connecting said retaining edges together, one leg of each V-shaped web being connected to an end of the arc of a retaining edge and the other leg of each web being connected to an opposed end of the arc of the other retaining edge, the apexes of the V-shaped webs pointing in opposite directions away from said edges in a direction perpendicular to the axis of the edges, said securing ring being insertable through said opening in the housing and into said cylindrical receiving space so that the securing ring abuts said housing and thereby is retained against axial movement relative to the housing and said arcuate retaining edges are concentric with the axis of the receiving space and fixed against movement in an axial direction with respect to the housing with the chamfered surfaces thereof facing the entrance end of the housing, and means for holding the retaining edges against substantial movement in a first radial direction parallel to a line passing through the apexes of the webs when the securing ring is inserted into the housing while permitting the retaining edges to be pushed apart in a second radial direction substantially perpendicular to said first radial direction against the resilience of said webs by the rib of the plug-in part as the part is pushed into the housing and then springing back and engaging behind said rib into a locked position to lock said part in said housing, the apex of at least one of said V-shaped webs of the securing ring being accessible from the outside of the housing, whereby upon pushing in on said at least one web in said first radial direction toward the axis of the receiving space, the retaining edges will spread apart in said second radial direction into an unlocked position, thereby disengaging the edges from said rib and permitting the plug-in part to be pulled out of the housing.

2. The plug-in connector of claim 1, wherein said means for holding includes the retaining edges of the securing ring have integrally formed, outwardly radially extending support blocks which have a thickness such that, when the edges of the ring are fully pressed together in a radial direction, the blocks fit through the opening in the wall of the housing wall and when the blocks are in the receiving space they fit into corresponding cutouts in the wall of the housing to fix said edges against axial movement and against movement in said first radial direction while permitting radial movement thereof in said second radial direction.

3. The plug-in connector of claim 2, including a pair of diametrically opposed openings in said wall of the housing, the securing ring being insertable through either opening and wherein the apexes of the two V-shaped webs include a pressure plate, each of which substantially fills an opening and lies flush with the outer surface of the housing when the edges of the ring are in the locked position, the edges being moveable to the unlocked position by pushing inwardly on both of said pressure plates.

4. The plug-in connector of claim 3, wherein the cylindrical receiving space includes a first cavity having an internal diameter corresponding to the external diameter of the plug-in part and a first shoulder farthest from the entrance end serving as a stop for the plug-in part and a second cavity between said first cavity and the entrance end having an internal diameter greater than the external diameter of the plug-in part, a second shoulder between said first and second cavities serving as a stop, a sealing ring positioned against said stop, said sealing ring having an inside diameter less than the outer diameter of the plug-in part and being preceded in the push-in direction of the push-in part by a spacer ring held axially in place by said securing ring to lock said sealing ring against said second shoulder.

5. The plug-in connector of claim 1, including a pair of diametrically opposed openings in said wall of the housing, the securing ring being insertable through either opening and wherein the apexes of the two V-shaped webs include a pressure plate, each of which substantially fills an opening and lies flush with the outer surface of the housing when the edges of the ring are in the locked position, the edges being moveable to the unlocked position by pushing inwardly on both of said pressure plates.

* * * * *